(12) United States Patent
Park

(10) Patent No.: US 12,483,960 B2
(45) Date of Patent: Nov. 25, 2025

(54) CONTROL OF EXECUTION OF NFC HANDOVER OPERATION FOR WI-FI DIRECT CONNECTION

(71) Applicant: Hewlett-Packard Development Company, L.P., Spring, TX (US)

(72) Inventor: Sung Joon Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 512 days.

(21) Appl. No.: 18/023,146

(22) PCT Filed: Apr. 13, 2021

(86) PCT No.: PCT/US2021/026973
§ 371 (c)(1),
(2) Date: Feb. 24, 2023

(87) PCT Pub. No.: WO2022/055553
PCT Pub. Date: Mar. 17, 2022

(65) Prior Publication Data
US 2023/0319673 A1 Oct. 5, 2023

(30) Foreign Application Priority Data
Sep. 11, 2020 (KR) .................... 10-2020-0117201

(51) Int. Cl.
*H04W 4/00* (2018.01)
*H04W 36/00* (2009.01)
(Continued)

(52) U.S. Cl.
CPC ....... *H04W 36/326* (2023.05); *H04W 36/035* (2023.05); *H04W 36/144* (2023.05)

(58) Field of Classification Search
CPC ............. H04W 36/326; H04W 36/035; H04W 36/144; H04W 84/12; H04W 84/18;
(Continued)

(56) References Cited

U.S. PATENT DOCUMENTS

| 8,660,492 | B2 * | 2/2014 | Hong | ................ H04M 1/72445 455/436 |
| 9,007,312 | B2 * | 4/2015 | Kim | .................... G06F 3/04883 345/173 |

(Continued)

FOREIGN PATENT DOCUMENTS

JP 2019-057853 A 4/2019

*Primary Examiner* — Amancio Gonzalez
(74) *Attorney, Agent, or Firm* — Brooks, Cameron & Huebsch, PLLC

(57) ABSTRACT

An example control method of an electronic apparatus includes, activating a near field communication (NFC) function, based on a terminal apparatus approaching within a threshold distance from an electronic apparatus and handover data being transmitted, performing an NFC handover operation, monitoring a Wi-Fi direct connection state between the terminal apparatus and the electronic apparatus, based on the Wi-Fi direct connection state being identified as a failure, inactivating the NFC function, and after a set time in a state wherein the electronic apparatus maintains the threshold distance with the terminal apparatus, reactivating the inactivated NFC function and reperforming the NFC handover operation based on the handover data.

15 Claims, 13 Drawing Sheets

(51) Int. Cl.
  *H04W 36/32* (2009.01)
  *H04W 36/14* (2009.01)

(58) Field of Classification Search
  CPC ... H04W 88/06; H04W 4/80; H04W 36/0079;
  Y02D 30/70
  USPC .......................................................... 370/331
  See application file for complete search history.

(56) References Cited

U.S. PATENT DOCUMENTS

| | | | | |
|---|---|---|---|---|
| 9,042,819 B2* | 5/2015 | Dua | ...................... | H04W 4/70 |
| | | | | 343/873 |
| 9,345,057 B2* | 5/2016 | Li | ...................... | H04W 76/14 |
| 9,560,565 B2* | 1/2017 | Zhao | ................ | H04W 36/0033 |
| 9,565,320 B2* | 2/2017 | Iwauchi | ............. | H04N 1/00204 |
| 9,575,699 B2 | 2/2017 | Ichikawa et al. | | |
| 9,961,484 B2* | 5/2018 | Choi | ...................... | H04W 12/04 |
| 10,122,871 B2 | 11/2018 | Mihira | | |
| 10,318,950 B2* | 6/2019 | Adams | ................... | G06Q 40/00 |
| 10,324,668 B2* | 6/2019 | Kawai | .................. | G06F 3/1204 |
| 10,356,275 B2* | 7/2019 | Yokoyama | ............... | H04B 1/00 |
| 10,887,489 B2* | 1/2021 | Miyata | ................. | H04N 1/4426 |
| 11,102,830 B2* | 8/2021 | Tsujii | .................... | H04W 76/14 |
| 11,330,033 B2* | 5/2022 | Munoz | ..................... | H04L 65/61 |
| 11,663,317 B2* | 5/2023 | Mousseau | ............. | H04W 12/08 |
| | | | | 726/17 |
| 12,251,358 B2* | 3/2025 | Higgins | .................. | G16H 80/00 |
| 2013/0157566 A1* | 6/2013 | Oguchi | ................... | H04W 4/80 |
| | | | | 455/41.1 |
| 2013/0346494 A1* | 12/2013 | Nakfour | ............... | H04W 76/14 |
| | | | | 709/204 |
| 2014/0091987 A1* | 4/2014 | Lee | ..................... | H04L 65/1094 |
| | | | | 345/2.3 |
| 2015/0249946 A1* | 9/2015 | Oh | ..................... | H04W 36/035 |
| | | | | 370/331 |
| 2016/0011835 A1 | 1/2016 | Igarashi | | |
| 2016/0066132 A1 | 3/2016 | Hillan et al. | | |
| 2016/0127581 A1 | 5/2016 | Suzuki | | |
| 2017/0064129 A1 | 3/2017 | Lee et al. | | |
| 2017/0264758 A1* | 9/2017 | Naito | ..................... | H04W 4/80 |

* cited by examiner

CONTROL OF EXECUTION OF NFC HANDOVER OPERATION FOR WI-FI DIRECT CONNECTION

BACKGROUND

An electronic apparatus may refer to an apparatus that is provided with power and performs various operations or functions. As an example, an electronic apparatus may include an image forming apparatus. An image forming apparatus may refer to an apparatus which prints printing data generated at a terminal apparatus like a computer on printing paper. As examples of such an image forming apparatus, there may be copiers, printers, facsimiles, scanners, or multi-function peripherals (MFPs) which implement the functions of the aforementioned apparatuses through one apparatus, etc.

DETAILED DESCRIPTION

Figure 1A:
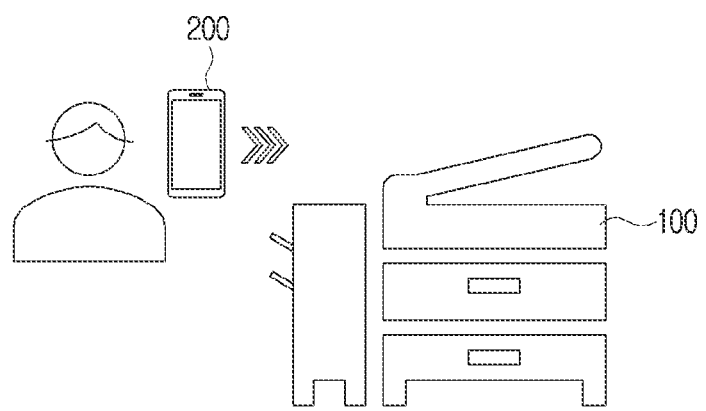
FIG. 1A is a diagram illustrating an operation of a terminal apparatus approaching an electronic apparatus according to an example.

Hereinafter, various examples of the disclosure will be described with reference to the accompanying drawings. The examples described below may be implemented while being modified into several different forms.

A description that one element is "connected to" another element may be interpreted to include both the case where one element is 'directly connected to' another element, and the case where one element is 'connected to another element through still another element.' Also, a description that one element "includes" another element can be interpreted to mean that other elements may additionally be included, but not that other elements are excluded, unless there is a specific description meaning the contrary. Each example may be independently implemented or operated, but each example may also be implemented or operated in combination.

The term, "an electronic apparatus" may refer to an apparatus that is provided with power and that may perform various operations or functions. Examples of such an electronic apparatus may include an image forming apparatus, a communication apparatus, a power apparatus, a display apparatus, an audio apparatus, etc.

The term "image forming job" may refer to any of various kinds of jobs (e.g., copying, printing, scanning, faxing, etc.) related to an image such as formation of an image or generation/storing/transmission of an image file, etc. Also, the term "job" may refer to an image forming job, or may refer to any or all of a series of processes for performing an image forming job.

The term, "image printing apparatus" may refer to an apparatus that prints printing data generated at a terminal apparatus like a computer on a recording medium such as paper. An example of such an image forming apparatus includes a copier, a printer, a facsimile, a scanner, or a multi-function peripheral (MFP) that implements the functions of the aforementioned apparatuses through one apparatus, etc.

The term, "terminal apparatus" may refer to an apparatus that transmits data which is a subject of an image forming job to an electronic apparatus. In various examples, a terminal apparatus may be a smartphone, a tablet personal computer (PC), etc.

The term, "user" may refer to a person who performs a manipulation for a terminal apparatus, or performs a manipulation of connecting to an electronic apparatus wirelessly by using a terminal apparatus.

The term "handover" may refer to an operation of connecting a terminal apparatus and an electronic apparatus by using a low speed communication method, and changing to a connection of communication between the two apparatuses to a high speed communication method. For example, a low speed communication method may be a Near Field Communication (NFC) method, and a high speed communication method may be a Wi-Fi direct communication method. Accordingly, "an NFC handover" may refer to an operation of changing a connection of communication between two apparatuses connected by an NFC method to a Wi-Fi direct communication method.

As an example, a terminal apparatus and an electronic apparatus may be connected by an NFC method. An NFC method may include a connection process based on a terminal apparatus approaching an electronic apparatus within a threshold distance. A terminal apparatus connected by an NFC method to an electronic apparatus may read information for connection using Wi-Fi direct communication from the electronic apparatus. The terminal apparatus may perform connection of communication with the electronic apparatus by a Wi-Fi direct communication method based on the read information for Wi-Fi direct connection. The terminal apparatus may transmit data for an image forming job to the electronic apparatus by the Wi-Fi direct communication method. The electronic apparatus may perform an image forming job based on the received data.

However, due to noise from an ambient apparatus, etc., an error may occur in an NFC connection process or a Wi-Fi direct communication connection process. If a connection attempt of a terminal apparatus with an electronic apparatus fails, a user should reattempt the connection process. In this case, there is an inconvenience for the user of having to separate the terminal apparatus from the electronic apparatus by greater than or equal to a threshold distance, and making the terminal apparatus approach the electronic apparatus within the threshold distance.

Accordingly, examples of the disclosure provide an apparatus and a method for recognizing an error in a connection of communication between a terminal apparatus and an electronic apparatus, and reattempting connection automatically, for improving user convenience.

Figure 1B:
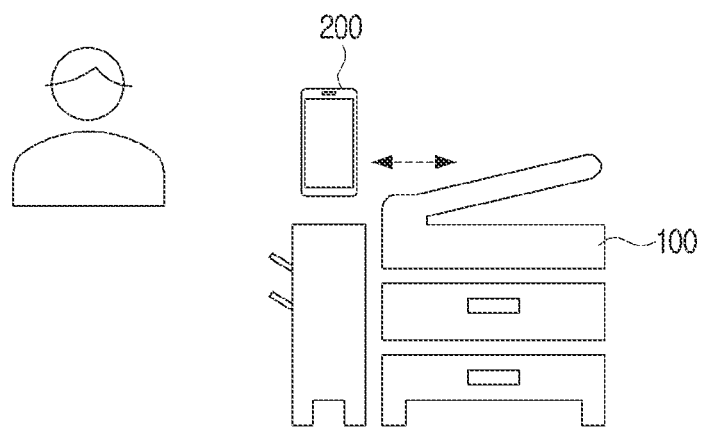
FIG. 1B is a diagram illustrating an operation of a terminal apparatus and an electronic apparatus performing near field communication (NFC) according to an example.

FIG. 1A is a diagram illustrating an operation of a terminal apparatus approaching an electronic apparatus according to an example, and FIG. 1B is a diagram illustrating an operation of a terminal apparatus and an electronic apparatus performing NFC according to an example. With reference to FIG. 1A and FIG. 1B, an example process in which a terminal apparatus performs NFC with an electronic apparatus will be described.

Referring to FIG. 1A, an electronic apparatus 100 and a terminal apparatus 200 are illustrated. The electronic apparatus 100 may be connected with the terminal apparatus 200 (i.e., a communication channel may be established between the electronic apparatus 100 and the terminal apparatus 200) by a wireless communication method. Based on connecting communication of the electronic apparatus 100 with the terminal apparatus 200, the electronic apparatus 100 may receive data from the terminal apparatus 200 and perform an operation (e.g., print) using the received data. For example, the electronic apparatus 100 may receive data from the terminal apparatus 200 through a high speed communication method such as Wi-Fi direct. The communication of the electronic apparatus 100 with the terminal apparatus 200 may be connected by a low speed communication method first, and afterwards, the connection of communication may be changed to a high speed communication method.

The electronic apparatus 100 may transmit information for connecting to the terminal apparatus 200 by a high speed communication method through a low speed communication method. Alternatively, the terminal apparatus 200 may read information for connecting by a high speed communication method from the electronic apparatus 100 through a low speed communication method.

The communication of the terminal apparatus 200 with the electronic apparatus 100 may be connected by a low speed communication method such as an NFC method. Using an NFC method, communication may be performed within a distance of about 10 cm between communicating devices. Accordingly, as illustrated in FIG. 1A, a user may cause the terminal apparatus 200 to approach within a threshold distance (e.g., about 10 cm) from the electronic apparatus 100.

Referring to FIG. 1B, if the distance between the electronic apparatus 100 and the terminal apparatus 200 becomes within the threshold distance, the electronic apparatus 100 and the terminal apparatus 200 may perform an NFC connection process. As an example, in the external housing of the electronic apparatus 100, an area wherein an NFC module is arranged may exist and may be displayed. Also, the area wherein the NFC module is arranged may be implemented having a horizontal state or a state close to a horizontal state. However, the described arrangement is merely an example, and the area wherein an NFC module is arranged of the electronic apparatus 100 may be implemented having any angle if the area, based on the terminal apparatus 200 being placed on the area, provides a state wherein the terminal apparatus 200 would be stable (e.g., would not be moved due to gravity).

Accordingly, a user may locate the terminal apparatus 200 in the area wherein the NFC module is arranged of the electronic apparatus 100.

The electronic apparatus 100 may store information for NFC connection and may store information for changing to a Wi-Fi direct communication method. The electronic apparatus 100 may store the information in the NFC module of the electronic apparatus 100. Also, the electronic apparatus 100 may activate an NFC function so that the terminal apparatus 200 can be connected at anytime. If the terminal apparatus 200 approaches within a threshold distance from the electronic apparatus 100, the terminal apparatus 200 may read the information stored in the NFC module of the electronic apparatus 100. Based on the terminal apparatus 200 reading the information of the electronic apparatus 100, the electronic apparatus 100 may recognize that the terminal apparatus 200 has approached, and exchange (i.e., transmit and receive) information for NFC connection. Also, the electronic apparatus 100 may monitor the connection state of Wi-Fi direct communication.

Figure 1C:
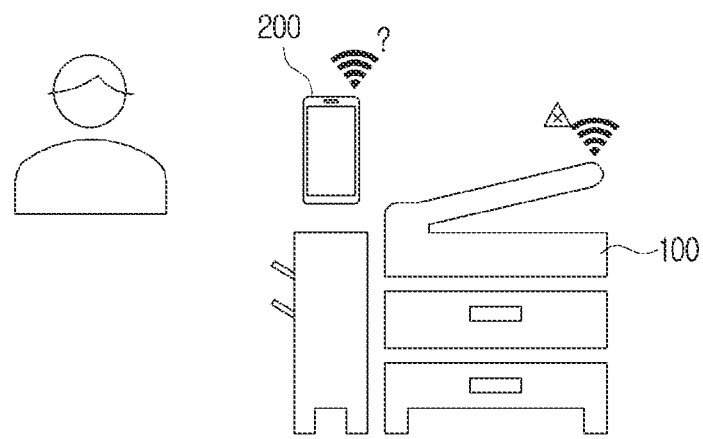
FIG. 1C is a diagram illustrating a failure of a Wi-Fi direct communication connection between a terminal apparatus and an electronic apparatus according to an example.
Figure 1D:
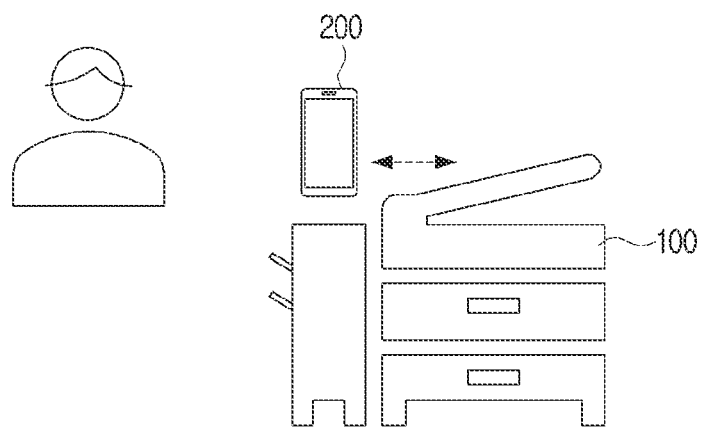
FIG. 1D is a diagram illustrating an operation of reperforming NFC between a terminal apparatus and an electronic apparatus according to an example.
Figure 1E:
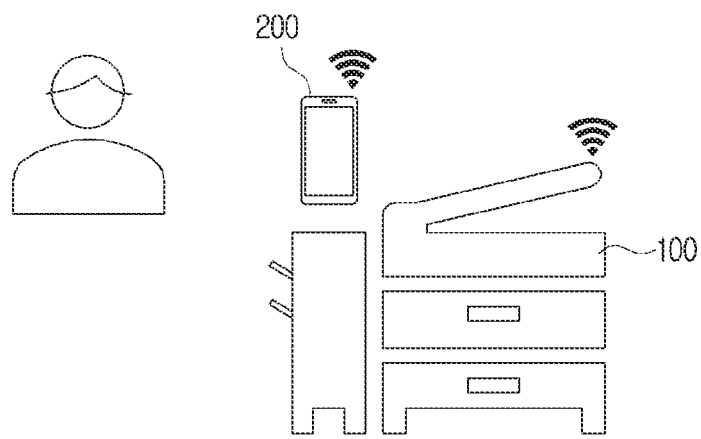
FIG. 1E is a diagram illustrating a successful handover between a terminal apparatus and an electronic apparatus according to an example.

FIG. 1C is a diagram illustrating a failure of a Wi-Fi direct communication connection between a terminal apparatus and an electronic apparatus according to an example, FIG. 1D is a diagram illustrating an operation of reperforming NFC between a terminal apparatus and an electronic apparatus according to an example, and FIG. 1E is a diagram illustrating a successful handover between a terminal apparatus and an electronic apparatus according to an example. With reference to FIG. 1C to FIG. 1E, an example process of performing an NFC handover will be described.

The terminal apparatus 200 may perform NFC connection with the electronic apparatus 100, and obtain (e.g., read) information from the electronic apparatus 100 for changing a communication method (e.g., for performing an NFC handover). The terminal apparatus 200 may request connection of Wi-Fi direct communication to the electronic apparatus 100 based on the obtained information. However, as illustrated in FIG. 1C, connection of Wi-Fi direct communication between the terminal apparatus 200 and the electronic apparatus 100 may fail. For example, failure of connection may occur due to different wireless specifications of the electronic apparatus 100 and the terminal apparatus 200, different supported channels, noise caused by an ambient wireless device, the wireless performance of the electronic apparatus 100, etc.

In general, if the change of communication methods between the electronic apparatus 100 and the terminal apparatus 200 fails, the terminal apparatus 200 should restart from the NFC connection process. Accordingly, a user should separate the terminal apparatus 200 from the electronic apparatus 100, and cause the terminal apparatus 200 to approach the electronic apparatus 100 again. However, in examples of the disclosure, a change of communication operation may be reattempted without separating the terminal apparatus 200 from the electronic apparatus 100.

As illustrated in FIG. 1D, the terminal apparatus 200 may not be separated from the electronic apparatus 100. As described above, the electronic apparatus 100 may monitor the connection state of Wi-Fi direct communication. If the electronic apparatus 100 identifies that connection of Wi-Fi direct communication with the terminal apparatus 200 is not successful, the electronic apparatus 100 may inactivate the NFC function of the electronic apparatus 100. That is, inactivation of the NFC function of the electronic apparatus 100 may have the same effect as separation of the terminal apparatus 200 from the electronic apparatus 100. In a state wherein the terminal apparatus 200 does not move and maintains a close distance with the electronic apparatus 100, based on a specific set time passing, the electronic apparatus 100 may reactivate the inactivated NFC function. That is, reactivation of the NFC function of the electronic apparatus 100 may have the same effect as approach of the terminal apparatus 200 to the electronic apparatus 100.

With reactivation of the inactivated NFC function by the electronic apparatus 100, the terminal apparatus 200 may obtain (e.g., read) the information stored in the electronic apparatus 100 from the electronic apparatus 100 again. That is, in the same manner as the aforementioned process, the electronic apparatus 100 and the terminal apparatus 200 may perform an NFC connection process. The electronic apparatus 100 may monitor the connection process of Wi-Fi direct communication. The terminal apparatus 200 may request connection of Wi-Fi direct communication to the electronic apparatus 100. The electronic apparatus 100 and the terminal apparatus 200 may exchange (e.g., transmit and receive) information for connection of Wi-Fi direct communication.

As illustrated in FIG. 1E, based on the connection process of Wi-Fi direct communication finishing, the electronic apparatus 100 and the terminal apparatus 200 may be connected by a Wi-Fi direct communication method. That is, the communication method between the electronic apparatus 100 and the terminal apparatus 200 may be changed from an NFC method to a Wi-Fi direct communication method. The terminal apparatus 200 may transmit data (e.g., a subject of an image forming job) to the electronic apparatus 100 through a Wi-Fi direct communication method.

Figure 2:
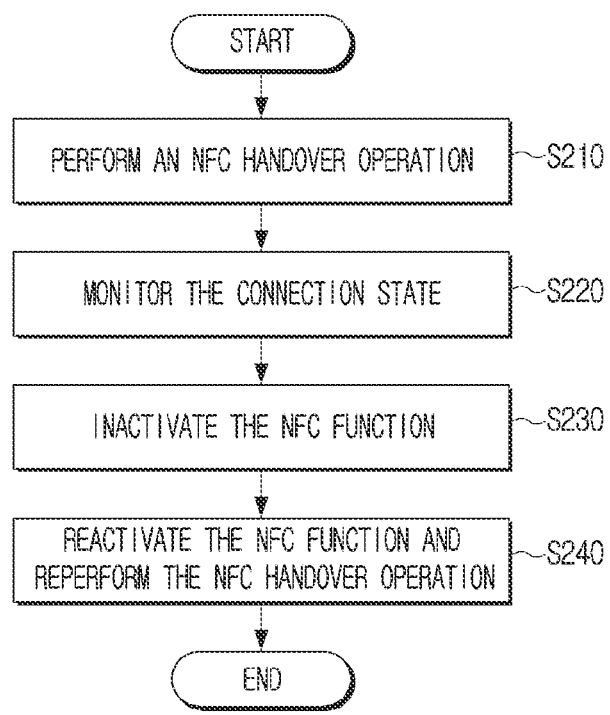
FIG. 2 is a flow chart illustrating a control process of an electronic system according to an example.

FIG. 2 is a flow chart illustrating a control process of an electronic system according to an example.

Referring to FIG. 2, an electronic apparatus may activate an NFC function and wait for an occurrence of an event such as an approach of a terminal apparatus.

The electronic apparatus may generate NFC Data Exchange Format (NDEF) data and store the data. In an example, the electronic apparatus may store the data in an NFC interface internal memory. For example, the NDEF data may include information for connection of Wi-Fi direct communication. Also, the NDEF data may include a frequency band of Wi-Fi direct, a channel of Wi-Fi direct, internet protocol (IP) information of the electronic apparatus, etc. The electronic apparatus may store the NDEF data, and activate the NFC function.

Based on a terminal apparatus approaching within a threshold distance and exchanging handover data, the electronic apparatus may perform an NFC handover operation at operation S210. For example, the terminal apparatus may read the NDEF data from the electronic apparatus. That is, the terminal apparatus may read information for connection of Wi-Fi direct communication. In an example, the electronic apparatus may recognize that the terminal apparatus approached. The electronic apparatus and the terminal apparatus may exchange (e.g., transmit and receive) information for NFC connection. The terminal apparatus may make a request for connection of Wi-Fi direct communication to the electronic apparatus.

The electronic apparatus may monitor the connection state of Wi-Fi direct communication at operation S220. The electronic apparatus may wait until connection of Wi-Fi direct communication is finished. If it is identified that the connection state of Wi-Fi direct communication is a failure, the electronic apparatus may inactivate the NFC function at operation S230. As an example, the electronic apparatus may inactivate the NFC function and identify the frequency band of Wi-Fi direct. If the frequency band of Wi-Fi direct set in the electronic apparatus is a specific frequency band, the electronic apparatus may change the frequency band to a basic frequency band. Alternatively, the electronic apparatus may inactivate the NFC function and identify the channel of Wi-Fi direct based on information on the country in which the electronic apparatus is located. If the channel of Wi-Fi direct is a channel not supported by the country, the electronic apparatus may change the channel of Wi-Fi direct to a channel supported by the country.

The electronic apparatus may reactivate the inactivated NFC function after a set time, and reperform the NFC handover operation at operation S240. Based on the electronic apparatus reactivating the NFC function, the terminal apparatus may restart the NFC connection process. That is, the terminal apparatus may read the NDEF data again. Here, the terminal apparatus may be in a state of maintaining a close distance with the electronic apparatus.

In an example, in case the electronic apparatus reperforms the NFC handover operation, the electronic apparatus may transmit the IP information of the electronic apparatus to the terminal apparatus in advance. Alternatively, in case the terminal apparatus is a terminal apparatus previously connected to the electronic apparatus, and information related to the NFC handover operation is stored in the electronic apparatus, the electronic apparatus may transmit the information related to the NFC handover operation to the terminal apparatus.

For example, if it is identified that the connection state of Wi-Fi direct communication is a failure, the electronic apparatus may inactivate the NFC function, and activate the NFC function again. Here, the terminal apparatus may not move, and maintain a location within a threshold distance from the electronic apparatus. By reperforming the NFC handover operation automatically, the electronic apparatus may reattempt connection of Wi-Fi direct communication without a need for movement of the terminal apparatus, even if connection of Wi-Fi direct communication with the terminal apparatus fails.

Figure 3:
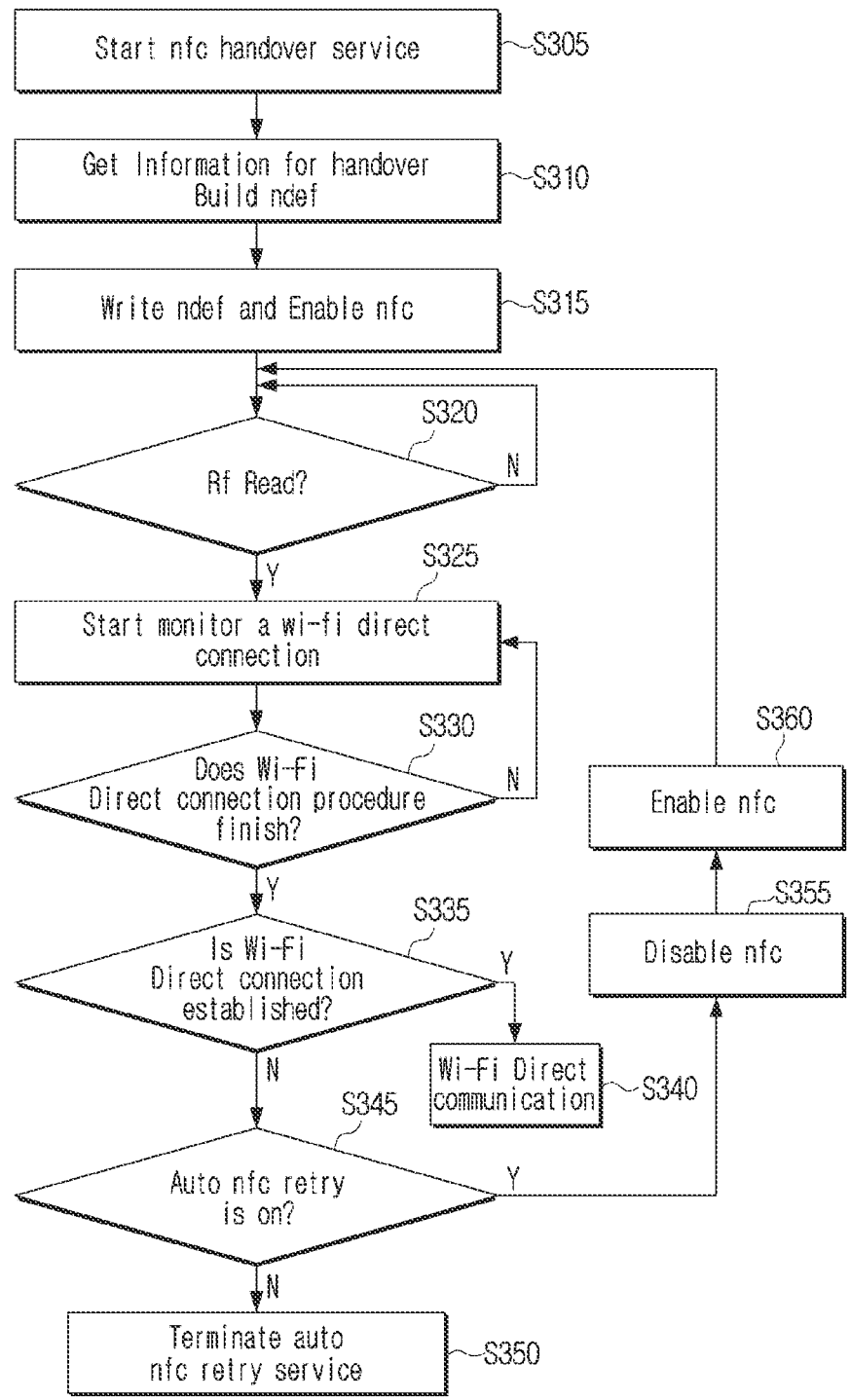
FIG. 3 is a flow chart illustrating a handover process according to an example.

FIG. 3 is a flow chart illustrating a handover process according to an example.

Referring to FIG. 3, an electronic apparatus may start an NFC handover service at operation S305. The electronic apparatus may acquire information for a handover and generate NDEF data at operation S310. The electronic apparatus may store the NDEF data and activate an NFC function at operation S315.

In an example, based on a process for an NFC handover starting, the electronic apparatus may generate NDEF data for performing a handover from NFC connection to connection of Wi-Fi direct communication based on the operation state of Wi-Fi direct, and a set value for connection of Wi-Fi direct communication. The electronic apparatus may store the generated NDEF data and activate (i.e., enable) the NFC function.

The electronic apparatus may identify whether the NDEF data is read at operation S320. As an example, the electronic apparatus may identify whether radio frequency (RF) data is read. If the NDEF data is not read at operation S320—N, the electronic apparatus may maintain the standby state. If the NDEF data is read at operation S320—Y, the electronic apparatus may monitor the connection state of Wi-Fi direct communication at operation S325.

If the terminal apparatus approaches within a threshold distance from the NFC module of the electronic apparatus or contacts the NFC module, the terminal apparatus may perform connection of communication with the electronic apparatus by an NFC method. The NFC module of the terminal apparatus may read the NDEF data from the electronic apparatus. For example, the NDEF data may include a set parameter for connection of Wi-Fi direct communication. The terminal apparatus may perform a handover operation from an NFC method to a Wi-Fi direct method.

In an example, the NFC module of the electronic apparatus may recognize that reading of NDEF data by the terminal apparatus has occurred. The electronic apparatus may generate an event. By the generated event, the electronic apparatus may recognize that a data reading event has occurred and store the state information. The electronic apparatus may monitor the Wi-Fi direct connection state.

The electronic apparatus may identify whether the connection process of Wi-Fi direct communication has finished at operation S330. If the connection process of Wi-Fi direct communication has not finished at operation S330—N, the electronic apparatus may keep monitoring the connection state of Wi-Fi direct communication at operation S325.

If the connection process of Wi-Fi direct communication has finished at operation S330—Y, the electronic apparatus may identify whether connection of Wi-Fi direct communication succeeds at operation S335 (e.g., if a Wi-Fi connection is established). If connection of Wi-Fi direct communication succeeds at operation S335—Y, the electronic apparatus may perform communication with the terminal apparatus by a Wi-Fi direct communication method at operation S340.

If connection of Wi-Fi direct communication fails at operation S335—N, the electronic apparatus may identify whether setting of automatic reattempt of NFC connection is in an on state at operation S345. If connection of the terminal apparatus to Wi-Fi direct fails, the electronic apparatus may operate according to setting of automatic reattempt of NFC connection.

If a setting of automatic reattempt of NFC connection is in an off state at operation S345—N, the electronic apparatus may finish the automatic NFC reattempt service at operation S350. On the other hand, if the setting of automatic reattempt of NFC connection is in an on state at operation S345—Y, the electronic apparatus may inactivate the NFC function at operation S355 and activate the NFC function again after a set time at operation S360.

The electronic apparatus may identify whether to allow NFC connection according to a setting of automatic reattempt of NFC connection. If the NFC function of the electronic apparatus is inactivated, the electronic apparatus may not respond to communication using an NFC method. If the NFC function of the electronic apparatus is activated, the electronic apparatus may respond to communication using an NFC method. The terminal apparatus may attempt to periodically read data from the electronic apparatus through the NFC module. However, if the NFC function of the electronic apparatus is in an inactivated state, the electronic apparatus may not respond. If the NFC function of the electronic apparatus is activated, the electronic apparatus may respond. The terminal apparatus may read the NDEF data as it first read data according to a response of the electronic apparatus, and reperform the connection process of Wi-Fi direct communication.

Figure 4:
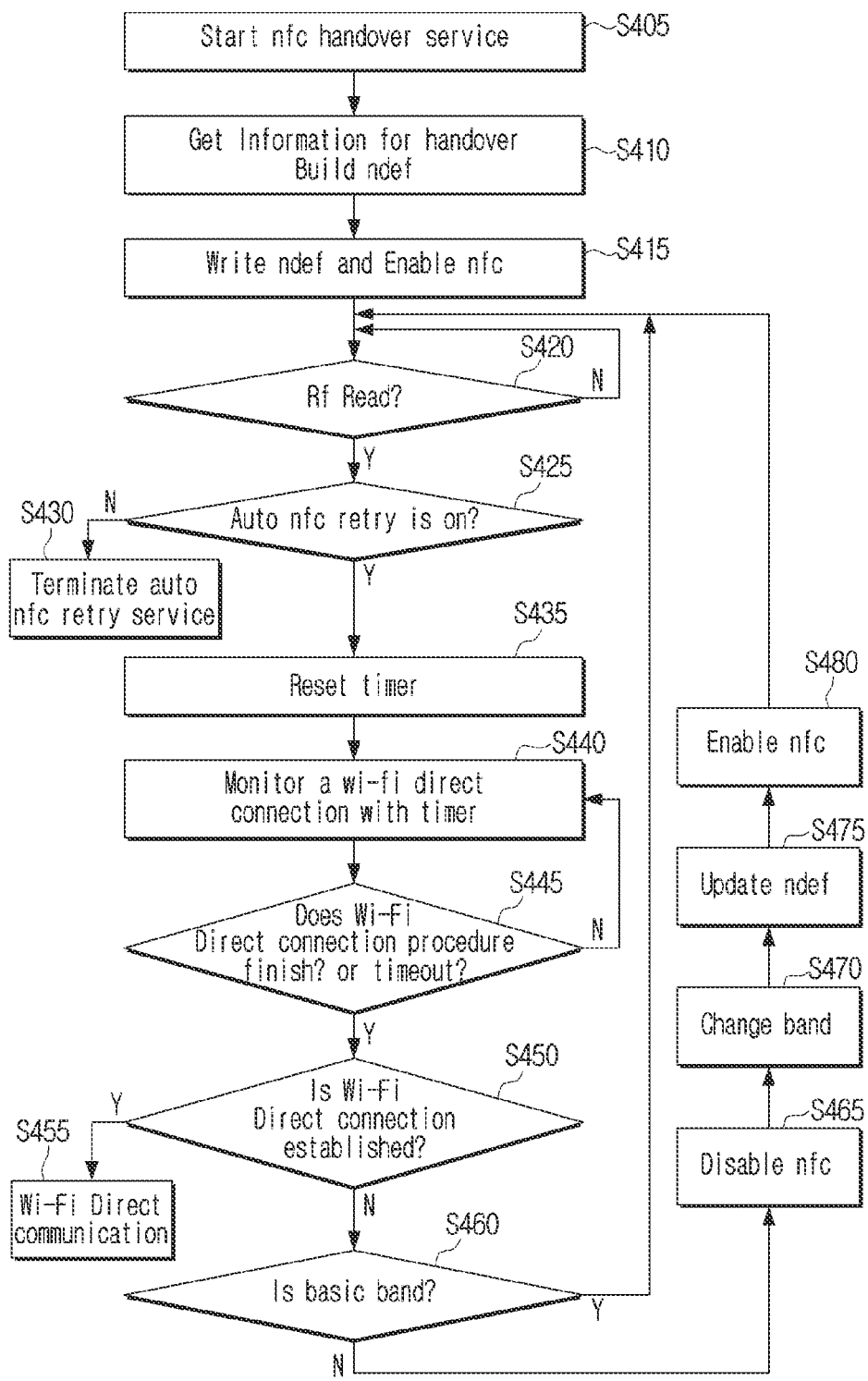
FIG. 4 is a flow chart illustrating a handover process according to an example.

FIG. 4 is a flow chart illustrating a handover process according to an example.

Referring to FIG. 4, the electronic apparatus may start an NFC handover service at operation S405. The electronic apparatus may acquire information for a handover and generate NDEF data at operation S410. The electronic apparatus may store the NDEF data and activate an NFC function at operation S415.

The electronic apparatus may generate NDEF data for an NFC handover and store the NDEF data, and activate (i.e., enable) the NFC function.

The electronic apparatus may identity whether the NDEF data is read at operation S420. As an example, the electronic apparatus may identify whether radio frequency (RF) data is read. If the NDEF data is not read at operation S420—N, the electronic apparatus may maintain the standby state. If the NDEF data is read at operation S420—Y, the electronic apparatus may monitor whether setting of automatic reattempt of NFC connection is in an on state at operation S425.

If the terminal apparatus approaches within a threshold distance from the NFC module of the electronic apparatus or contacts the NFC module, the terminal apparatus may perform connection of communication with the electronic apparatus by an NFC method. The NFC module of the terminal apparatus may read the NDEF data from the electronic apparatus. For example, the NDEF data may include a set parameter for connection of Wi-Fi direct communication. The terminal apparatus may perform a handover operation from an NFC method to a Wi-Fi direct method.

If setting of automatic reattempt of NFC connection is in an off state at operation S425—N, the electronic apparatus may finish the automatic NFC reattempt service at operation S430. On the other hand, if setting of automatic reattempt of NFC connection is in an on state at operation S425—Y, the electronic apparatus may reset a timer at operation S435. The electronic apparatus may monitor the connection state of Wi-Fi direct communication with the timer at operation S440.

The electronic apparatus may identify whether the process of Wi-Fi direct communication was finished or timed out at operation S445. If the process of Wi-Fi direct communication was not finished or timed out at operation S445—N, the electronic apparatus may keep monitoring the connection state of Wi-Fi direct communication with the timer at operation S440.

If the process of Wi-Fi direct communication is finished or timed out at operation S445—Y, the electronic apparatus may identify whether connection of Wi-Fi direct communication succeeds at operation S450 (e.g., if a Wi-Fi direct connection is established). If connection of Wi-Fi direct communication succeeds at operation S450—Y, the electronic apparatus may perform communication with the terminal apparatus by a Wi-Fi direct communication method at operation S455.

If connection of Wi-Fi direct communication fails at operation S450—N, the electronic apparatus may identify whether the set Wi-Fi direct band is a basic band at operation S460. If the set Wi-Fi direct band is a basic band at operation S460—Y, the electronic apparatus may perform a process of automatic reattempt of NFC connection with the previous set value. If the set Wi-Fi direct band is not a basic band at operation S460—N, the electronic apparatus may inactivate the NFC function at operation S465. The electronic apparatus may change the Wi-Fi direct band at operation S470 and update the NDEF data based on the changed band information at operation S475.

For example, wireless support specifications may be different between the terminal apparatus and the electronic apparatus. In this case, the electronic apparatus performing a role of a group owner may set the wireless support specification of the terminal apparatus, or convert to a basic specification and perform an automatic reattempt process.

As an example, the Wi-Fi direct bands of the electronic apparatus and the terminal apparatus may not coincide. If the electronic apparatus recognizes generation of reading of NFC data by the terminal apparatus, the electronic apparatus may operate the timer and perform monitoring for the Wi-Fi direct connection state. The electronic apparatus may repeatedly identify whether the connection process was finished, whether the time exceeded, etc. If connection fails, the electronic apparatus may identify whether the set Wi-Fi direct band is a basic band. If the set Wi-Fi direct band is not a basic band and the option of the automatic reattempt of NFC connection is in an on state, the electronic apparatus may change the Wi-Fi direct band to a basic band. The electronic apparatus may change the NDEF data based on the changed Wi-Fi direct band information. As an example, the ID of the band information included in the NDEF data may be 0x103C, and as a band value, 0x01 may mean 2.4 GHz, and 0x02 may mean 5 GHz. Here, the electronic apparatus may change the band value from 0x02 to 0x01. In FIG. 4, an example regarding a frequency band was described, but the electronic apparatus may also identify channel information for a channel in a similar manner, and change the channel information.

The electronic apparatus may activate the NFC function again after a set time at operation S480, and reattempt the automatic NFC connection process at operation S420.

Figure 5:
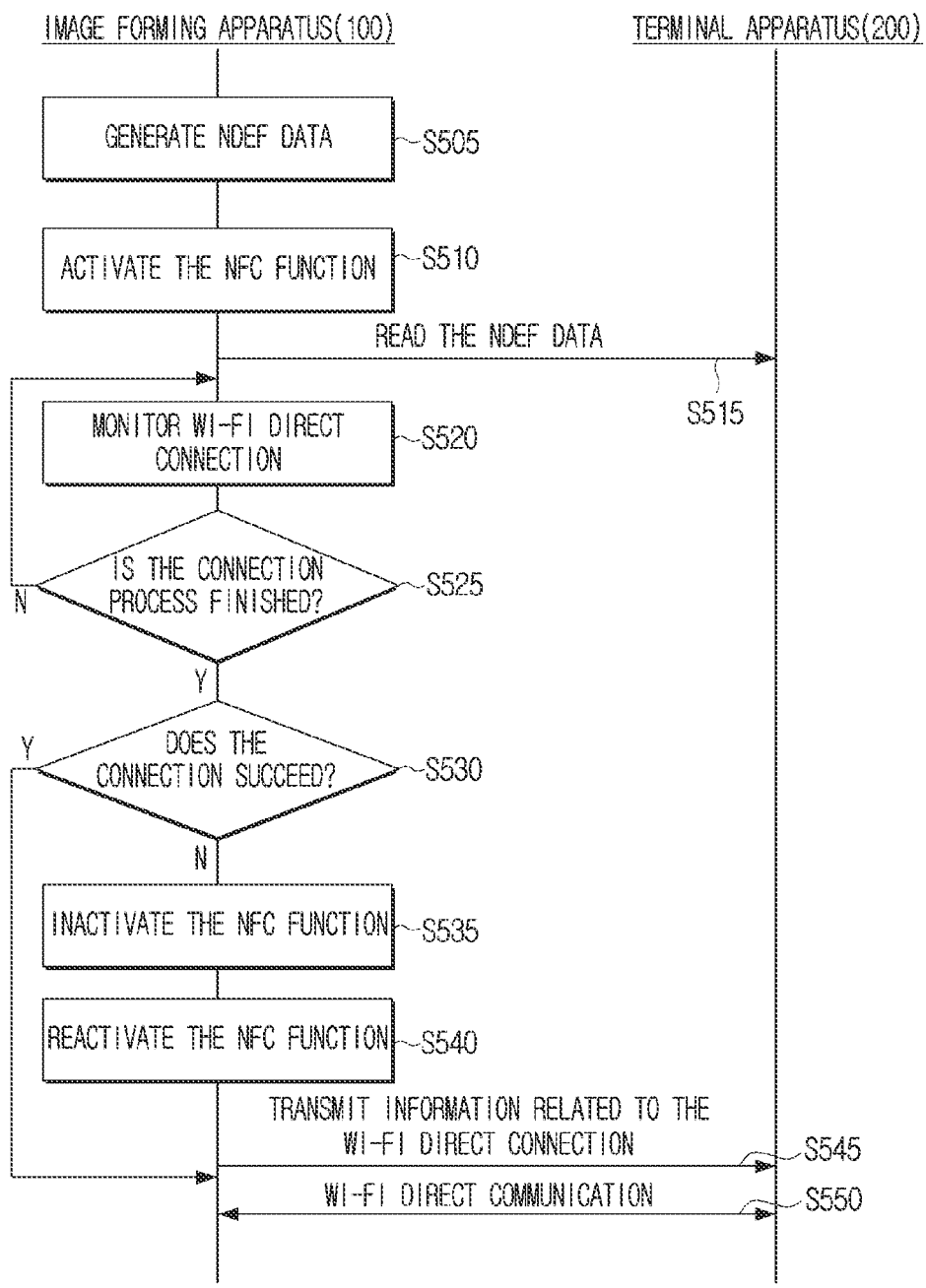
FIG. 5 is a sequence diagram illustrating operations performed by an electronic apparatus and a terminal apparatus in a handover process according to an example.

FIG. 5 is a sequence diagram illustrating operations performed by an electronic apparatus and a terminal apparatus in a handover process according to an example.

Referring to FIG. 5, the electronic apparatus 100 may generate NDEF data at operation S505. The NDEF data may include information for performing a handover from an NFC connection to a Wi-Fi direct communication connection. For example, the NDEF data may include an operation state of Wi-Fi direct, set values (e.g., band information, channel information, IP information, etc.) for connection of Wi-Fi direct communication, etc. The NDEF data may be stored in an internal memory of the NFC module.

The electronic apparatus 100 may activate the NFC function at operation S510. The terminal apparatus 200 may approach the electronic apparatus 100 and read the NDEF data at operation S515. The terminal apparatus 200 may select information for connection of Wi-Fi direct communication in the read NDEF data.

The electronic apparatus 100 may monitor the Wi-Fi direct connection state at operation S520. The electronic apparatus 100 may operate the timer and proceed with monitoring during a set time. Here, the terminal apparatus 200 may search the electronic apparatus 100, and the electronic apparatus 100 may transmit a response signal to the terminal apparatus 200. The terminal apparatus 200 may request a Wi-Fi direct connection to the electronic apparatus 100. The electronic apparatus 100 may allot resources (e.g., a band, a channel, an IP, etc.) to the terminal apparatus 200 and connect to the terminal apparatus 200 by a Wi-Fi direct communication method.

The electronic apparatus 100 may identify whether the connection process of Wi-Fi direct is finished at operation S525. If the connection process is not finished at operation S525—N, the electronic apparatus 100 may keep monitoring the connection state at operation S520. If the connection process is finished at operation S525—Y, the electronic apparatus 100 may identify whether Wi-Fi direct connection succeeds at operation S530.

If connection of Wi-Fi direct communication succeeds at operation S530—Y, the electronic apparatus 100 and the terminal apparatus 200 may perform communication by a Wi-Fi direct communication method at operation S550.

In the electronic apparatus 100, the state of automatic reattempt of NFC connection may be set as an on state. Here, if connection of Wi-Fi direct communication fails at operation S530—N, the electronic apparatus 100 may inactivate the NFC function at operation S535.

Here, the electronic apparatus 100 may identify the frequency band of Wi-Fi direct. If the frequency band of Wi-Fi direct is a specific frequency band, the electronic apparatus 100 may change the frequency band to a basic frequency band and update the NDEF data. Alternatively, the electronic apparatus 100 may identify the channel of Wi-Fi direct based on information on the country wherein the electronic apparatus 100 is located. If the channel of Wi-Fi direct is a channel not supported by the country wherein the electronic apparatus 100 is located, the electronic apparatus 100 may change the channel of Wi-Fi direct to a channel supported by the country and update the NDEF data.

The electronic apparatus 100 may reactivate the NFC function after a set time at operation S540. The electronic apparatus 100 may transmit information related to Wi-Fi direct connection at operation S545. As an example, the electronic apparatus 100 may transmit IP information of the electronic apparatus 100 to the terminal apparatus 200 in advance. Alternatively, in case the terminal apparatus 200 is a terminal apparatus previously connected, and information related to an NFC handover operation is stored, the electronic apparatus 100 may provide the information related to an NFC handover operation to the terminal apparatus 200. As the electronic apparatus 100 provides information related to connection of Wi-Fi direct communication to the terminal apparatus 200 in advance, time spent for connection of Wi-Fi direct communication can be reduced, and the possibility of success can be enhanced. The terminal apparatus 200 may read the NDEF data from the electronic apparatus 100, and perform the NFC handover process again.

If connection of Wi-Fi direct communication succeeds, the electronic apparatus 100 and the terminal apparatus 200 may perform communication by a Wi-Fi direct communication method at operation S550.

In various examples, based on a handover from an NFC method to a Wi-Fi direct communication method failing, the handover process is automatically reattempted without a user's intervention, and accordingly, user convenience can be increased, and usability can be improved.

Figure 6:
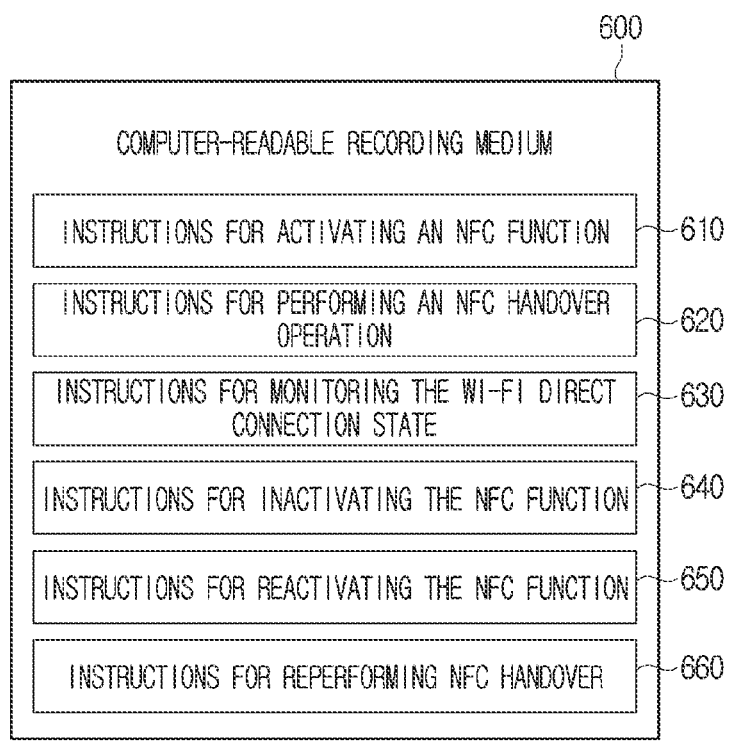
FIG. 6 is a diagram illustrating instructions stored in a computer-readable recording medium according to an example.

FIG. 6 is a diagram illustrating instructions stored in a computer-readable recording medium according to an example.

Referring to FIG. 6, the aforementioned control process performed in an electronic apparatus may be implemented in the form of a non-transitory computer-readable recording medium storing instructions executable by a computer or a processor or data. The computer-readable recording medium 600 may store instructions related to the aforementioned operations of the electronic apparatus. For example, the computer-readable recording medium 600 may include instructions 610 for activating an NFC function, instructions 620 for performing an NFC handover operation if a terminal apparatus approaches within a threshold distance from an electronic apparatus and handover data is transmitted, instructions 630 for monitoring the connection state of Wi-Fi direct communication, instructions 640 for inactivating an NFC function, instructions 650 for reactivating the NFC function, and instructions 660 for reperforming the NFC handover operation based on the handover data.

The non-transitory computer-readable recording medium described above may store a read-only memory (ROM), a random-access memory (RAM), a flash memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a magnetic tape, a floppy disk, a magneto-optical data storage apparatus, an optical data storage apparatus, a hard disk, a solid-state disk (SSD), and machine readable instructions, related data, data files, and data structures. Also, the non-transitory computer-readable recording medium may be any apparatus that can provide machine readable instructions, related data, data files, and data structures to a processor or a computer so that the processor or the computer can execute instructions.

An example method of automatically reperforming an NFC handover has been described. Hereinafter, examples of an electronic apparatus and a terminal apparatus will be described.

Figure 7:
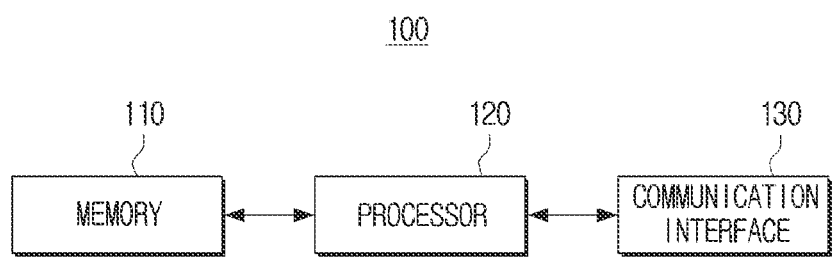
FIG. 7 is a block diagram illustrating an electronic apparatus according to an example.

FIG. 7 is a block diagram illustrating an electronic apparatus according to an example.

Referring to FIG. 7, the electronic apparatus 100 may include a memory 110, a processor 120, and a communication interface 130.

The memory 110 may store an instruction regarding the electronic apparatus 100. For example, in the memory 110, various kinds of programs (e.g., machine readable instructions) for making the electronic apparatus 100 operate according to the various examples may be stored. Also, the memory 110 may store NDEF data including data for connection of Wi-Fi direct communication.

The processor 120 may control an operation of the electronic apparatus 100. The processor 120 may generate NDEF data including the operation state of Wi-Fi direct, a set value for connection of Wi-Fi direct communication, etc. and store the NDEF data in the memory 110. Also, the processor 120 may reattempt connection of Wi-Fi direct communication based on information transmitted from the communication interface 130. In addition, the processor 120 may activate or inactivate the function of the communication interface 130 (e.g., the NFC module). The processor 120 may change data such as the frequency band, the channel, etc. of Wi-Fi direct, and update the NDEF data. Such a processor 120 may include a single apparatus like a central processing unit (CPU), or may include a plurality of apparatuses such as a clock generation circuit, a CPU, a graphic processor, etc.

The communication interface 130 may perform communication with a terminal apparatus. The communication interface 130 may connect the electronic apparatus 100 to an external apparatus. As an example, the communication interface 130 may connect the electronic apparatus 100 to an external apparatus through a wireless communication (e.g., Wi-Fi 802.11a/b/g/n, NFC, Bluetooth, etc.) network, a local area network (LAN), an Internet network, a universal serial bus (USB) port, etc. Such a communication interface 130 may also be referred to as a communication part, a communication module, a communication apparatus, a transceiver, etc.

The communication interface 130 may transmit and receive data to and from a terminal apparatus by an NFC communication method. Based on the electronic apparatus connecting to the terminal apparatus by a Wi-Fi direct communication method, the communication interface 130 may transmit and receive data by a Wi-Fi direct communication method. The communication interface 130 may transmit the NDEF data to the terminal apparatus (e.g., reading of the terminal apparatus), generate an event signal, and transmit the signal to the processor 120. Also, the communication interface 130 may receive data of a subject of a printing job from the terminal apparatus 200.

Although not illustrated in FIG. 7, the electronic apparatus 100 may further include an execution screen of an application program, and a display to display data such as a user interface, etc. For example, the display may be implemented as a display using a liquid crystal display LCD, a light emitting diode (LED), an organic LED (OLED), a flexible form, a touch screen, etc. Also, the electronic apparatus 100 may further include a speaker to output received information, etc. as a sound, an input interface to receive input of a user instruction, etc.

Figure 8:
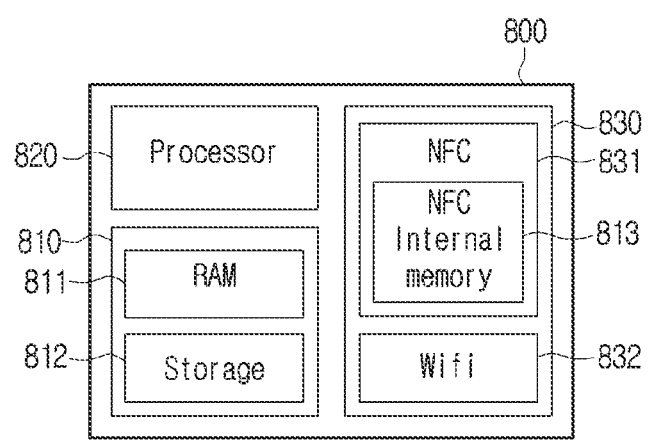
FIG. 8 is a block diagram illustrating an electronic apparatus according to an example.

FIG. 8 is a block diagram illustrating an electronic apparatus according to an example.

Referring to FIG. 8, an electronic apparatus 800 may include a memory 810, a processor 820, and a communication interface 830. Also, the memory 810 may include a RAM 811, a storage 812, and an NFC internal memory 813.

The RAM 811 may store information for sharing a temporary state between the electronic apparatus 800 and a terminal apparatus with each other. For example, the RAM 811 may temporarily store information of a state of operating by a Wi-Fi direct communication method and connection statistic information, etc. The information stored in the RAM 811 may be shared with the processor 820.

The storage 812 may store a set value (e.g., on or off) of the option of automatic reattempt of NFC connection. Also, the storage 812 may store information of a state of operating by a Wi-Fi direct communication method and connection statistic information together with the RAM 811, or store the information in place of the RAM 811.

The NFC internal memory 813 may be a memory included in an NFC module 831, and it may store data for a handover. That is, the NFC internal memory 813 may store data by which a terminal apparatus can perform communication with the electronic apparatus 800 through Wi-Fi direct.

The processor 820 may decide whether to reattempt NFC connection by determining the state and the condition transmitted from the communication interface 830 (e.g., the Wi-Fi module).

The processor 820 may load information for the NFC module 831 from the RAM 811 or the storage 812, change the information to a form for the NFC module 831, and store it in the NFC internal memory 813. The processor 820 may recognize an event signal transmitted from the NFC module 831 and monitor whether the Wi-Fi direct connection was completed successfully. The processor 820 may receive the Wi-Fi direct connection state from a Wi-Fi module 832. For example, the processor 820 may periodically identify the connection state, and based on the state of the Wi-Fi module 832 changing, the processor 820 may receive the information from the Wi-Fi module 832.

The processor 820 may request state information to the Wi-Fi module 831, and receive the state information from the Wi-Fi module 831. Alternatively, the processor 820 may include a plurality of individual processors to control each module. In this case, the main processor may request state information to the Wi-Fi module control processor controlling the Wi-Fi module 832, and receive the state information from the Wi-Fi module control processor.

In case connection fails, and the setting of the option of automatic reattempt of connection is in an on state, the processor 820 may inactivate the NFC module 831, and activate the NFC module 831 again after a set time.

The communication interface 830 may include the NFC module 831 and the Wi-Fi module 832. The NFC module 831 may transmit NDEF data stored in the NFC internal memory 813 through reading of a terminal apparatus by an NFC method. The NFC module 831 may be activated or inactivated according to control of the processor 820. Regarding an activation or inactivation signal, the processor 820 may generate information in a set form, and transmit the information to the NFC module 831 through an interface (e.g., I2C, UART, USB, etc.) by which NFC can receive information.

The terminal apparatus may read the NDEF data from the NFC module 831 of the electronic apparatus 800. Based on the terminal apparatus reading the NDEF data, the NFC module 831 may provide an event signal to the processor 820 by a method that the processor 820 can recognize. As an example, the NFC module 831 may provide an event signal in a form such as from low to high or from high to low through a dedicated line connected with the processor 820. The processor 820 may recognize a change of the signal state by a method such as interruption regarding the provided event signal.

The Wi-Fi module 832 may perform high speed wireless communication with the terminal apparatus. The Wi-Fi module 832 may receive setting information from the processor 820 and operate, and store information of the operation result in the RAM 811 or the storage 812 through the processor 820.

Figure 9:
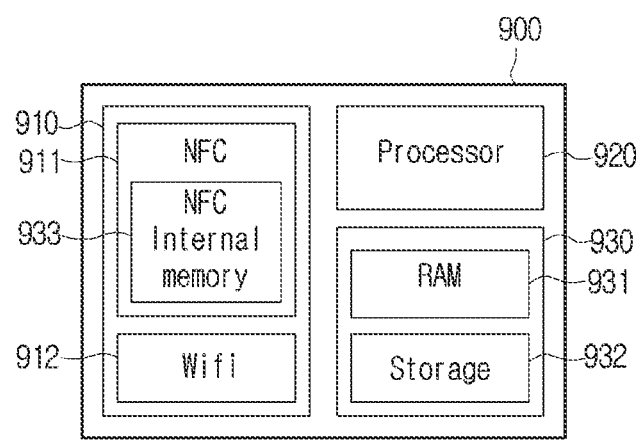
FIG. 9 is a block diagram illustrating a terminal apparatus according to an example.

FIG. 9 is a block diagram illustrating a terminal apparatus according to an example.

Referring to FIG. 9, a terminal apparatus 900 may include a communication interface 910, a processor 920, and a memory 930. Also, the communication interface 910 may include an NFC module 911 and a Wi-Fi module 912.

The NFC module 911 may include a reader function and read NDEF data from an NFC module of an electronic apparatus. Also, the Wi-Fi module 912 may transmit and receive data through a Wi-Fi direct communication method.

The processor 920 may perform Wi-Fi direct connection based on data read from the NFC module 911 and control each component performing a Wi-Fi direct connection operation. Also, the processor 920 may perform an operation for connection of Wi-Fi direct communication based on the NDEF data read from the electronic apparatus. As an example, the processor 920 may include a plurality of processors to individually control each component or to individually perform each function. In this case, the main processor may transmit the read NDEF data to a processor performing a handover function. The processor performing a handover function may request an operation related to Wi-Fi direct connection to a related processor based on the transmitted NDEF data. The processor 920 may control the Wi-Fi module 912 and perform a Wi-Fi direct connection process with the electronic apparatus.

The memory 930 may include a RAM 931, a storage 932, and an NFC internal memory 933. The RAM 931 may store information processed by the processor 920 of the terminal apparatus temporarily, and the storage 932 may store information processed by the processor 920 permanently.

While examples have been shown and described, the disclosure is not limited to the aforementioned examples, and it is apparent that various modifications can be made without departing from the gist as claimed by the appended claims, and such modifications are within the scope of the descriptions of the claims.

What is claimed is:

1. A control method comprising:
    activating a near field communication (NFC) function;
    based on a terminal apparatus approaching within a threshold distance from an electronic apparatus and handover data being transmitted, performing an NFC handover operation;
    monitoring a Wi-Fi direct connection state between the terminal apparatus and the electronic apparatus;
    based on the Wi-Fi direct connection state being identified as a failure, inactivating the NFC function; and
    after a set time in a state wherein the electronic apparatus maintains the threshold distance with the terminal apparatus, reactivating the inactivated NFC function and reperforming the NFC handover operation based on the handover data.

2. The control method of claim 1, further comprising:
    generating NFC Data Exchange Format (NDEF) data and storing the data in an internal memory of an NFC interface module; and
    reading the NDEF data by the terminal apparatus.

3. The control method of claim 2, wherein the NDEF data includes a frequency band of Wi-Fi direct, a channel of Wi-Fi direct, or internet protocol (IP) information of the electronic apparatus.

4. The control method of claim 3, further comprising:
    based on the NFC function being inactivated, identifying the frequency band of the Wi-Fi direct; and
    based on the frequency band of the Wi-Fi direct being a specific frequency band, changing the frequency band to a basic frequency band.

5. The control method of claim 3, further comprising:
    based on the NFC function being inactivated, identifying the channel of the Wi-Fi direct based on a location of the electronic apparatus; and
    based on the channel of the Wi-Fi direct being a channel not supported by the location, changing the channel of the Wi-Fi direct to a channel supported by the location.

6. The control method of claim 3, wherein the reperforming of the NFC handover operation comprises transmitting the IP information of the electronic apparatus to the terminal apparatus in advance.

7. The control method of claim 1, wherein the reperforming of the NFC handover operation comprises based on the terminal apparatus being a terminal apparatus previously connected, and information related to the NFC handover operation being stored, providing the information related to the NFC handover operation to the terminal apparatus.

8. An electronic apparatus comprising:
    a communication interface;
    a memory; and
    a processor to:
        activate a near field communication (NFC) function of the communication interface,
        based on a terminal apparatus approaching within a threshold distance from the communication interface and handover data being transmitted, perform an NFC handover operation,
        monitor a Wi-Fi direct connection state with the terminal apparatus,
        based on the Wi-Fi direct connection state being identified as a failure, inactivate the NFC function, and
        after a set time in a state of maintaining the threshold distance with the terminal apparatus, reactivate the inactivated NFC function and reperform the NFC handover operation based on the handover data.

9. The electronic apparatus of claim 8,
    wherein the communication interface includes an NFC interface module, wherein the memory includes an NFC interface internal memory included in the NFC interface module, wherein the processor is to generate NFC Data Exchange Format (NDEF) data and store the data in the NFC interface internal memory, and wherein the NDEF data is read by the terminal apparatus.

10. The electronic apparatus of claim 9, wherein the NDEF data includes a frequency band of Wi-Fi direct, a channel of Wi-Fi direct, or internet protocol (IP) information of the electronic apparatus.

11. The electronic apparatus of claim 10, wherein the processor, based on the NFC function being inactivated, is to:

identify the frequency band of the Wi-Fi direct, and based on the frequency band of the Wi-Fi direct being a specific frequency band, change the frequency band to a basic frequency band.

12. The electronic apparatus of claim 10, wherein the processor, based on the NFC function being inactivated, is to:

identify the channel of the Wi-Fi direct based on a location of the electronic apparatus, and based on the channel of the Wi-Fi direct being a channel not supported by the location, change the channel of the Wi-Fi direct to a channel supported by the location.

13. The electronic apparatus of claim 10, wherein the processor, based on the NFC handover operation being reperformed, is to transmit the IP information of the electronic apparatus to the terminal apparatus in advance through the NFC interface module.

14. The electronic apparatus of claim 8, wherein the processor, based on the terminal apparatus being a terminal apparatus previously connected, and information related to the NFC handover operation being stored, is to provide the information related to the NFC handover operation to the terminal apparatus through the communication interface.

15. A non-transitory computer-readable recording medium having a program for controlling a method of an electronic apparatus recorded thereon, wherein the non-transitory computer-readable recording medium comprises:

instructions to activate a near field communication (NFC) function;

instructions to, based on a terminal apparatus approaching within a threshold distance from an electronic apparatus and handover data being transmitted, perform an NFC handover operation;

instructions to monitor a Wi-Fi direct connection state;

instructions to inactivate the NFC function;

instructions to reactivate the NFC function after a set time in a state wherein the electronic apparatus maintains the threshold distance with the terminal apparatus; and instructions to reperform the NFC handover operation based on the handover data.

\* \* \* \* \*